Sept. 7, 1943.  R. W. SHANK  2,329,142

FLOW METER

Filed Oct. 17, 1940

Inventor:
Russell W. Shank.

Patented Sept. 7, 1943

2,329,142

UNITED STATES PATENT OFFICE 2,329,142

FLOWMETER

Russell W. Shank, Elizabethtown, Pa.

Application October 17, 1940, Serial No. 361,507

6 Claims. (Cl. 73—210)

This invention relates to a flow meter for measuring the flow of gas or liquid in a pipe line. It is particularly applicable for measuring the flow of fuel to an internal combustion engine such as is used in an automobile or airplane, and may also be used to measure the flow of fuel to oil or gas burners.

An object of the invention is to provide a flow meter to measure small and large flows instantly and accurately.

Figure 1:
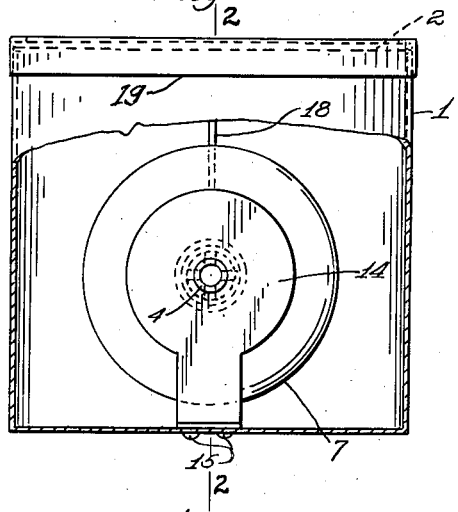
Fig. 1 is an end view of the invention with part of casing broken away.
Figure 2:
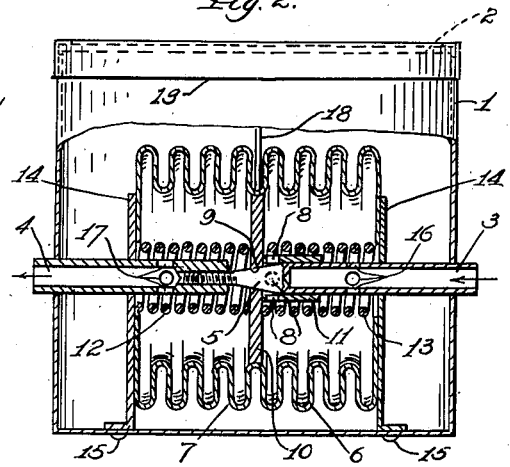
Fig. 2 is a cross sectional view along line 2—2 of Fig. 1.
Figure 3:
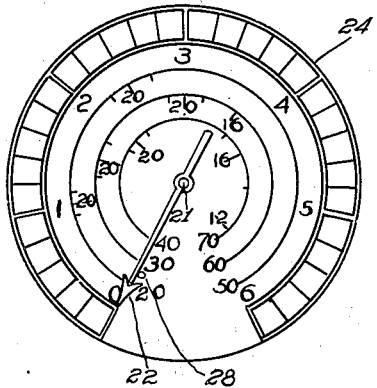
Fig. 3 shows the dial.

The flow meter is comprised of casing 1 with bezel 19 and window 2, provided at one side thereof an inlet conduit 3 and at the other side thereof an outlet conduit 4. Fixed to conduit 3 is metering part 5, one end of which is threaded into conduit 4 so that part 5 is coaxial with the conduits. Fixed to conduit 3 coaxially therewith within casing 1 is one end of bellows 6, the other end of which is also connected to plate 10. Plate 10 has orifice 9 which cooperates with the conical portion of metering part 5. Outstanding from plate 10 is guide part 11 with openings 8 which surrounds the inner part of conduit 3. Bellows 7 is fixed at one end to conduit 4 coaxially therewith, and its other end is fixed to plate 10. Springs 12 and 13 which are coaxially disposed around conduits 3 and 4 and guide part 11 are positioned within bellows 6 and 7 to resist movement thereof. Bellows 6 and 7 have on their exterior a stabilizing part 14 fastened to casing 1 with screws 15.

Conduit 3 has openings 16 which permit communication with the interior of bellows 6, while conduit 4 has openings 17 which communicate with the interior of bellows 7. Openings 16 and 17 in conduits 3 and 4 are spaced from the fixed ends of bellows 6 and 7. When the meter measures the flow of a fluid the spacing of openings 16 and 17 from the fixed ends of bellows 6 and 7 provides air pockets in such bellows in any position of the meter. Such air pockets tend to dampen pulsations or pressure waves.

Movement transmitting part 18 is fixed to plate 10 and is adapted to be connected by a flexible connection to pulley 20 fixed on shaft 21, carrying pointer 22. Movement of shaft 21 is resisted by spring 23. Shaft 21 is journaled in dial 24 and in plate 25 supported from dial 24 by posts 26 and 27. Pin 28 in dial 24 limits the movement of pointer 22. Dial 24 has a plurality of scales, the outermost of which is calibrated in units of volume per unit of time. The inner scales are calibrated to indicate the fuel consumption of internal combustion engine at designated speeds.

Figure 5:
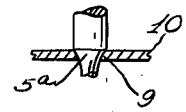
Figs. 5 and 6 show modification of the metering part.
Figure 4:
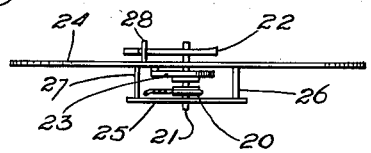
Fig. 4 shows the dial pointer and operating mechanism therefor.

As shown in Fig. 5, metering part 5a may have a concave metering section which cooperates with orifice 9 in a plate 10, so that calibrations on dial 24 may be uniformly spaced.

Figure 6:
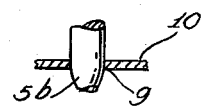

Fig. 6 shows metering part 5b having a convex metering section adapted to cooperate with orifice 9, and plate 10, to provide a definite spacing of the graduations on dial 24.

In operation conduit 3 is connected to a source of fluid under pressure and conduit 4 is connected to a point of use. Fluid flows through the conduit 3 and through openings 16 to the interior of the bellows 6. From bellows 6 the fluid flows through openings 8 in guide part 11 and through orifice 9 in plate 10 to the interior of bellows 7. Fluid from bellows 7 is discharged through openings 17 and conduit 4. As the fluid flows through the flow meter, the difference in pressure across orifice 9 causes bellows 6 to expand and bellows 7 to contract against the resistance of spring 12 to vary the cross sectional area of flow between orifice 9 and metering part 5 in accordance with the rate of flow. Thus plate 10 assumes a position varying with the flow and its movement is transmitted by part 18 and the flexible connection to turn pulley 20, shaft 21, and pointer 22 to indicate the rate of flow on dial 24.

If the device is used to measure the fuel consumption of an automobile, the automobile may be driven at predetermined speeds and pointer 22 will then indicate on the interior scales of dial 24 the number of miles per gallon.

Changes may be made in the construction and arrangement of parts without parting from the spirit and purpose of my invention.

What is claimed is:

1. A fluid flow meter comprising a cylindrical inlet conduit, a cylindrical outlet conduit axially aligned with said inlet conduit, a tapered metering part connecting said conduits and coaxial therewith, a rigid wall having an orifice cooperating with said metering part, a bellows coaxial with said inlet conduit and having one end fixed to said inlet conduit and the other end connected to said wall, a second bellows coaxial with said outlet conduit and connected at one end to said outlet conduit and connected at the other end to said wall, springs resisting movements of said bellows, said inlet conduit communicating with the interior of said bellows connected thereto and said outlet conduit communicating with the said bellows connected thereto whereby said wall is moved in accordance with the difference in pressure on the sides of said wall, and an indicator connected to said wall.

2. A fluid flow meter comprising a cylindrical inlet conduit, a cylindrical outlet conduit axially aligned with said inlet conduit, a tapered metering part connecting said conduits and coaxial therewith, a rigid wall having an orifice cooperating with said metering part, a bellows coaxial with said inlet conduit and having one end fixed to said inlet conduit and the other end connected to said wall, a second bellows coaxial with said outlet conduit and connected at one end to said outlet conduit and connected at the other end to said wall, springs resisting movements of said bellows, said inlet conduit communicating with the interior of said bellows connected thereto and said outlet conduit communicating with the said bellows connected thereto whereby said wall is moved in accordance with the difference in pressure on the sides of said wall, an indicator connected to said wall, and a guide part fastened to said wall, with flow hole openings, surrounding said metering part connecting said conduits and coaxial therewith.

3. A fluid flow meter comprising a cylindrical inlet conduit, a cylindrical outlet conduit axially aligned with said inlet conduit, a tapered metering part connecting said conduits and coaxial therewith, a rigid wall having an orifice cooperating with said metering part, a bellows coaxial with said inlet conduit and having one end fixed to said inlet conduit and the other end connected to said wall, a second bellows coaxial with said outlet conduit and connected at one end to said outlet conduit and connected at the other end to said wall, springs resisting movements of said bellows, said inlet conduit communicating with the interior of said bellows connected thereto and said outlet conduit communicating with the said bellows connected thereto whereby said wall is moved in accordance with the difference in pressure on the sides of said wall, an indicator connected to said wall, a guide part fastened to said wall, with flow hole openings, surrounding said metering part connecting said conduits and coaxial therewith, and one of said springs being a helical spring surrounding said inlet conduit, metering, and guide parts and coaxial therewith, the other of said springs being a helical spring surrounding said outlet conduit and coaxial therewith.

4. A fluid flow meter comprising a cylindrical inlet conduit, a cylindrical outlet conduit axially aligned with said inlet conduit, a tapered metering part connecting said conduits and coaxial therewith, a rigid wall having an orifice cooperating with said metering part, a bellows coaxial with said inlet conduit and having one end fixed to said inlet conduit and the other end connected to said wall, a second bellows coaxial with said outlet conduit and connected at one end to said outlet conduit and connected at the other end to said wall, springs resisting movements of said bellows, said inlet conduit communicating with the interior of said bellows connected thereto and said outlet conduit communicating with the said bellows connected thereto whereby said wall is moved in accordance with the difference in pressure on the sides of said wall, an indicator connected to said wall, a guide part fastened to said wall, with flow hole openings, surrounding said metering part connecting said conduits and coaxial therewith, one of said springs being a helical spring surrounding said inlet conduit, metering, and guide parts and coaxial therewith, and other of said springs being a helical spring surrounding said outlet conduit and coaxial therewith, and holes in said inlet conduit and said outlet conduit at such distance from the fixed ends of said bellows as to provide air pockets in said bellows regardless of position of said flow meter.

5. A fluid flow meter for measuring the fuel consumption of an automobile comprising a cylindrical inlet conduit, a cylindrical outlet conduit axially aligned with said inlet conduit, a tapered metering part connecting said conduits and coaxial therewith, a rigid wall having an orifice cooperating with said metering part, a bellows coaxial with said inlet conduit and having one end fixed to said inlet conduit and the other end connected to said wall, a second bellows coaxial with said outlet conduit and connected at one end to said outlet conduit and connected at the other end to said wall, springs resisting movements of said bellows, said inlet conduit communicating with the interior of said bellows connected thereto and said outlet conduit communicating with the said bellows connected thereto whereby said wall is moved in accordance with the difference in pressure on the sides of said wall, an indicator connected to said wall, a guide part fastened to said wall, with flow hole openings, surrounding said metering part connecting said conduits and coaxial therewith, one of said springs being a helical spring surrounding said inlet conduit, metering, and guide parts and coaxial therewith, the other of said springs being a helical spring surrounding said outlet conduit and coaxial therewith, holes in said inlet conduit and said outlet conduit at such distance from the fixed ends of said bellows as to provide air pockets in said bellows regardless of position of said flow meter, and a dial having a plurality of scales to indicate units of flow volume per unit of time and indicate miles per gallon at designated speeds of the automobile, cooperating with said indicator.

6. A fluid flow meter for measuring the fuel consumption of an automobile comprising a cylindrical inlet conduit, a cylindrical outlet conduit axially aligned with said inlet conduit, a tapered metering part connecting said conduits and coaxial therewith, a rigid wall having an orifice cooperating with said metering part, a bellows coaxial with said inlet conduit and having one end fixed to said inlet conduit and the other end connected to said wall, a second bellows coaxial with said outlet conduit and connected at one end to said outlet conduit and connected at the other end to said wall, springs resisting movements of said bellows, said inlet conduit communicating with the interior of said bellows connected thereto and said outlet conduit communicating with the said bellows connected thereto whereby said wall is moved in accordance with the difference in pressure on the sides of said wall, an indicator connected to said wall, a guide part fastened to said wall, with flow hole openings, surrounding said metering part connecting said conduits and coaxial therewith, one of said springs being a helical spring surrounding said inlet conduit, metering, and guide parts and coaxial therewith, the other of said springs being a helical spring surrounding said outlet conduit and coaxial therewith, holes in said inlet conduit and said outlet conduit at such distance from the fixed ends of said bellows as to provide air pockets in said bellows regardless of position of said flow meter, a dial having a plurality of scales to indicate units of flow volume per unit of time, and indicate miles per gallon at designated speeds of the automobile, cooperating with said indicator, said dial having uniform, increasing or decreasing scales depending on the shape of the metering part.

RUSSELL W. SHANK.